US009628631B2

United States Patent
Baba (10) Patent No.: US 9,628,631 B2
(45) Date of Patent: Apr. 18, 2017

(54) CONFERENCE TERMINAL CONTROL SYSTEM, CONFERENCE TERMINAL CONTROL DEVICE, AND CONFERENCE TERMINAL CONTROL METHOD

(71) Applicant: Ryoichi Baba, Tokyo (JP)

(72) Inventor: Ryoichi Baba, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 91 days.

(21) Appl. No.: 14/644,467

(22) Filed: Mar. 11, 2015

(65) Prior Publication Data

US 2015/0264184 A1  Sep. 17, 2015

(30) Foreign Application Priority Data

Mar. 17, 2014  (JP) ................... 2014-054229

(51) Int. Cl.
G06F 15/16 (2006.01)
H04M 3/56 (2006.01)
H04M 3/432 (2006.01)

(52) U.S. Cl.
CPC ........... H04M 3/565 (2013.01); H04M 3/432 (2013.01)

(58) Field of Classification Search
CPC ..................... H04M 3/565; H04M 3/432
See application file for complete search history.

(56) References Cited

U.S. PATENT DOCUMENTS

| 2004/0199580 | A1* | 10/2004 | Zhakov | H04L 12/1818 709/204 |
| 2004/0249884 | A1* | 12/2004 | Caspi | H04L 29/06027 709/204 |
| 2007/0143402 | A1* | 6/2007 | Kumagai | B43L 1/00 709/204 |
| 2009/0210490 | A1* | 8/2009 | Hawkins | G06Q 10/06 709/204 |
| 2009/0220064 | A1* | 9/2009 | Gorti | H04M 3/56 379/202.01 |

(Continued)

FOREIGN PATENT DOCUMENTS

| JP | 07-131538 | 5/1995 |
| JP | 2003-324533 | 11/2003 |

(Continued)

*Primary Examiner* — Jay P Patel
(74) *Attorney, Agent, or Firm* — Cooper & Dunham LLP (57) ABSTRACT

A conference terminal control system that controls conference terminals connected through a network. The system includes a reservation unit to receive an input of conference room identification information of each of two or more conference rooms where a conference over a network is conducted and a conference date and time, and make a reservation to conduct the conference over the network in the conference rooms at the conference date and time by using conference terminals respectively arranged in the conference rooms; and a conference terminal control unit to control the conference terminals to be in a power-on state and control the conference terminals to be able to conduct the conference over the network, based on the conference date and time and pieces of conference terminal identification information that respectively identify the conference terminals on the network and that are based on the pieces of conference room identification information.

6 Claims, 9 Drawing Sheets

(56) References Cited

U.S. PATENT DOCUMENTS

| | | | | |
|---|---|---|---|---|
| 2009/0254839 A1* | 10/2009 | Kripalani | .............. | G06F 3/0231 715/753 |
| 2009/0300520 A1* | 12/2009 | Ashutosh | ............ | H04L 12/1831 715/756 |
| 2010/0049579 A1* | 2/2010 | Suzuki | ............. | G06Q 10/06311 705/7.19 |
| 2010/0085417 A1* | 4/2010 | Satyanarayanan | .. | H04L 12/1822 348/14.08 |
| 2010/0208634 A1* | 8/2010 | Eng | ........................ | H04L 45/00 370/310 |
| 2011/0058013 A1* | 3/2011 | Khot | ..................... | H04M 3/565 348/14.09 |
| 2014/0247319 A1* | 9/2014 | Anderson | ................ | H04N 7/15 348/14.08 |
| 2014/0258214 A1* | 9/2014 | Tsukamoto | ......... | H04L 12/1831 707/608 |

FOREIGN PATENT DOCUMENTS

| | | |
|---|---|---|
| JP | 2004-096495 | 3/2004 |
| JP | 2010-212871 | 9/2010 |

* cited by examiner

| ID | CONFERENCE ROOM IDENTIFICATION INFORMATION | CONFERENCE ROOM NAME | CONFERENCE TERMINAL IDENTIFICATION INFORMATION |
|---|---|---|---|
| 1 | 1 | FIRST CONFERENCE ROOM | 192.168.10.2 |
| 2 | 2 | SECOND CONFERENCE ROOM | 192.168.10.3 |

FIG.7

| ID | CONFERENCE ROOM IDENTIFICATION INFORMATION | CONFERENCE ROOM NAME | CONFERENCE TERMINAL IDENTIFICATION INFORMATION |
|---|---|---|---|
| 2 | 3 | TWENTY-FIRST CONFERENCE ROOM | 192.168.20.2 |

FIG.8

| ID | CONFERENCE TERMINAL CONTROL DEVICE IDENTIFICATION INFORMATION | CONFERENCE ROOM IDENTIFICATION INFORMATION | CONFERENCE ROOM NAME | LOCATION |
|---|---|---|---|---|
| 1 | 192.168.10.1 | 1 | FIRST CONFERENCE ROOM | TOKYO |
| 2 | 192.168.10.1 | 2 | SECOND CONFERENCE ROOM | TOKYO |
| 3 | 192.168.20.1 | 3 | TWENTY-FIRST CONFERENCE ROOM | OSAKA |

FIG.9

CONFERENCE INFORMATION SCREEN

CONFERENCE DATE AND TIME: 2013/10/1 13:00-15:00

CONFERENCE NAME: MEETING FOR DEVELOPMENT

ROOMS WHERE CONFERENCE IS CONDUCTED: TOKYO ▽ FIRST CONFERENCE ROOM ▽

OSAKA ▽ TWENTY-FIRST CONFERENCE ROOM ▽

CONFERENCE TERMINAL IS: USED ▽

REGISTRATION

FIG.10

| ID | DATE | STARTING TIME | ENDING TIME | CONFERENCE NAME | USE OR NON-USE OF CONFERENCE TERMINAL | USE CONFERENCE ROOM IDENTIFICATION INFORMATION |
|---|---|---|---|---|---|---|
| 1 | 2014/2/1 | 13:00 | 15:00 | MEETING FOR DEVELOPMENT | USE | 1 |
| 2 | 2014/2/1 | 13:00 | 14:00 | REPORT CONFERENCE | NON-USE | 2 |

FIG.11

| ID | USE CONFERENCE ROOM IDENTIFICATION INFORMATION | CONFERENCE ROOM IDENTIFICATION INFORMATION |
|---|---|---|
| 1 | 1 | 1 |
| 2 | 1 | 3 |
| 3 | 2 | 2 |

CONFERENCE TERMINAL CONTROL SYSTEM, CONFERENCE TERMINAL CONTROL DEVICE, AND CONFERENCE TERMINAL CONTROL METHOD

CROSS-REFERENCE TO RELATED APPLICATIONS

The present application claims priority to and incorporates by reference the entire contents of Japanese Patent Application No. 2014-054229 filed in Japan on Mar. 17, 2014.

BACKGROUND OF THE INVENTION

1. Field of the Invention

The present invention relates to a conference terminal control system, a conference terminal control device, and a conference terminal control method.

2. Description of the Related Art

Conventionally, a technique is known which controls a reserved conference terminal and a reserved conference room to be able to conduct a conference when the reservation is started (i.e., when it becomes the reservation date and time) based on conference reservation information that indicates the reservation date and time, the reserved conference room, the reserved conference terminal, and the like (for example, see Japanese Laid-open Patent Publication No. 2003-324533).

However, in such a conventional technique as described above, an organizer of the conference has to reserve even a conference terminal. Therefore, to reserve a conference, the organizer has to grasp even a conference terminal used by a participant in the conference, so that the burden of the organizer is heavy.

Therefore, there is a need for a conference terminal control system, a conference terminal control device, and a conference terminal control method, which are able to simplifying an operation required to start a conference over a network.

SUMMARY OF THE INVENTION

It is an object of the present invention to at least partially solve the problems in the conventional technology.

According to an embodiment, a conference terminal control system controls conference terminals connected through a network. The conference terminal control system includes a reservation unit and one or more conference terminal control units. The reservation unit receives an input of conference room identification information of each of two or more conference rooms where a conference over a network is conducted and a conference date and time when the conference is conducted, and makes a reservation to conduct the conference over the network in the two or more conference rooms at the conference date and time by using two or more conference terminals respectively arranged in the two or more conference rooms. One or more conference terminal control units to control the two or more conference terminals to be in a power-on state and control the two or more conference terminals to be able to conduct the conference over the network, based on the conference date and time and two or more pieces of conference terminal identification information that respectively identify the two or more conference terminals on the network and that are based on the two or more pieces of conference room identification information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment of a conference terminal control system, a conference terminal control device, a conference terminal control method, and a program according to the present invention will be described in detail with reference to the drawings.

Figure 1:
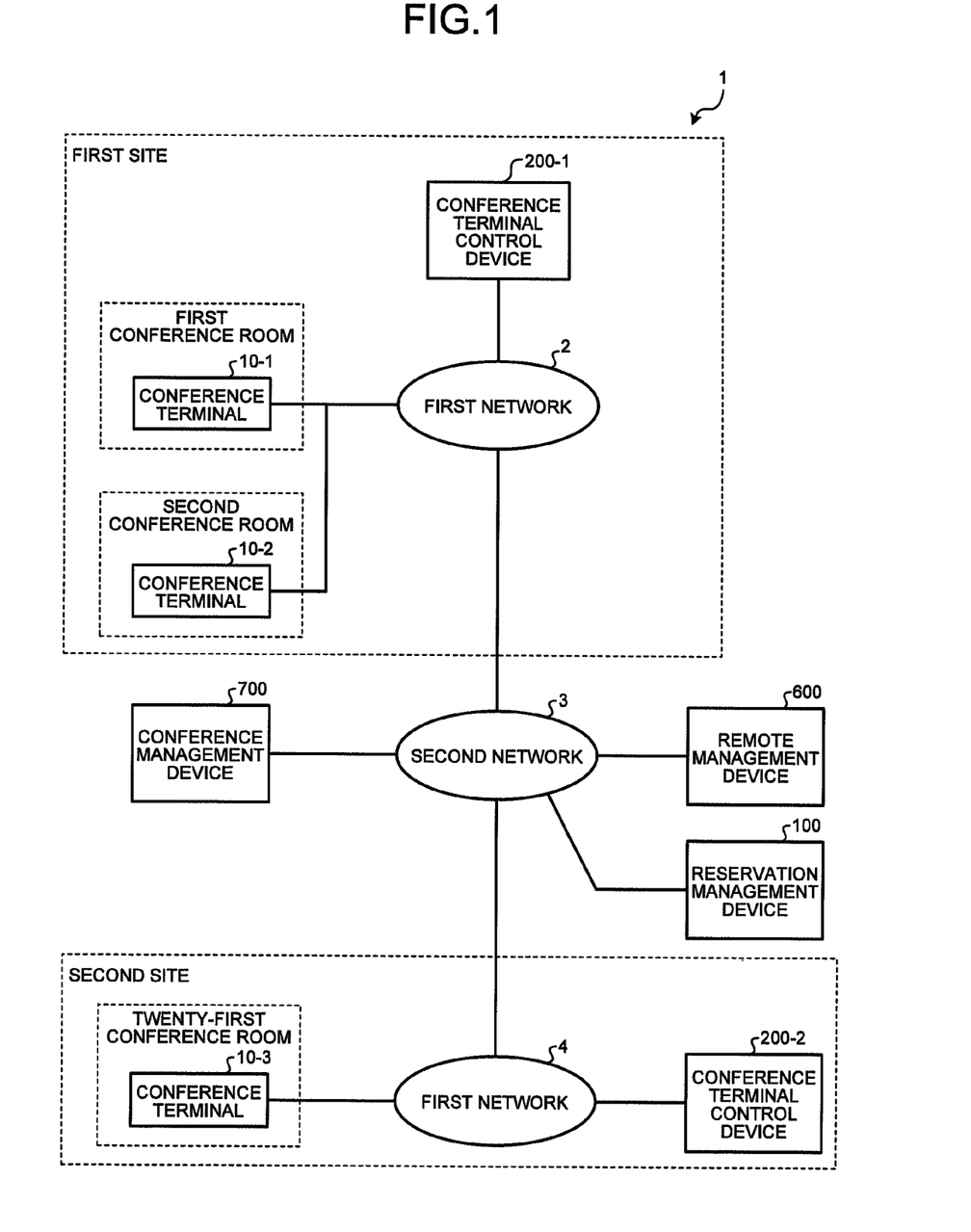
FIG. 1 is a block diagram illustrating an example of a configuration of a conference terminal control system of an embodiment.

FIG. 1 is a block diagram illustrating an example of a configuration of a conference terminal control system 1 of the embodiment. As illustrated in FIG. 1, the conference terminal control system 1 includes conference terminals 10-1 to 10-3, a reservation management device 100, conference terminal control devices 200-1 and 200-2, a remote management device 600, and a conference management device 700.

In a first site, the conference terminals 10-1 and 10-2 and the conference terminal control device 200-1 are arranged. The conference terminal 10-1 is a conference terminal arranged (installed) in a first conference room in the first site and the conference terminal 10-2 is a conference terminal arranged (installed) in a second conference room in the first site. The conference terminal control device 200-1 manages the conference terminals 10-1 and 10-2. Each apparatus and each device arranged in the first site are connected to a first network 2.

In a second site, the conference terminal 10-3 and the conference terminal control device 200-2 are arranged. The conference terminal 10-3 is a conference terminal arranged (installed) in a twenty-first conference room in the second site. The conference terminal control device 200-2 manages the conference terminal 10-3. Each apparatus and each device arranged in the second site are connected to a first network 4.

The first site and the second site are, for example, bases of a business enterprise, such as an office and a factory. It is assumed that the first site and the second site are respectively located in regions which are physically away from each other. In the example illustrated in FIG. 1, the first site and the second site are illustrated as the bases. However, the number of the bases is not limited to two, but may be three or more. The apparatuses and the devices arranged in each site are not limited to the apparatuses and the devices described above.

The first network 2 and the first network 4 are connected through a second network 3. The reservation management device 100, the remote management device 600, and the conference management device 700 are connected to the second network 3. The first network 2 and the first network 4 are, for example, a LAN (Local Area Network), and the second network 3 is, for example, the Internet. However, they are not limited to this. For example, the second network 3 may be a dedicated line or the like.

The conference terminals 10-1 to 10-3 are terminals used for a conference over a network. In the description below, when the conference terminals 10-1 to 10-3 need not be distinguished from each other, they may be simply referred to as a conference terminal 10, and when the conference terminal control devices 200-1 and 200-2 need not be distinguished from each other, they may be simply referred to as a conference terminal control device 200.

Figure 2:
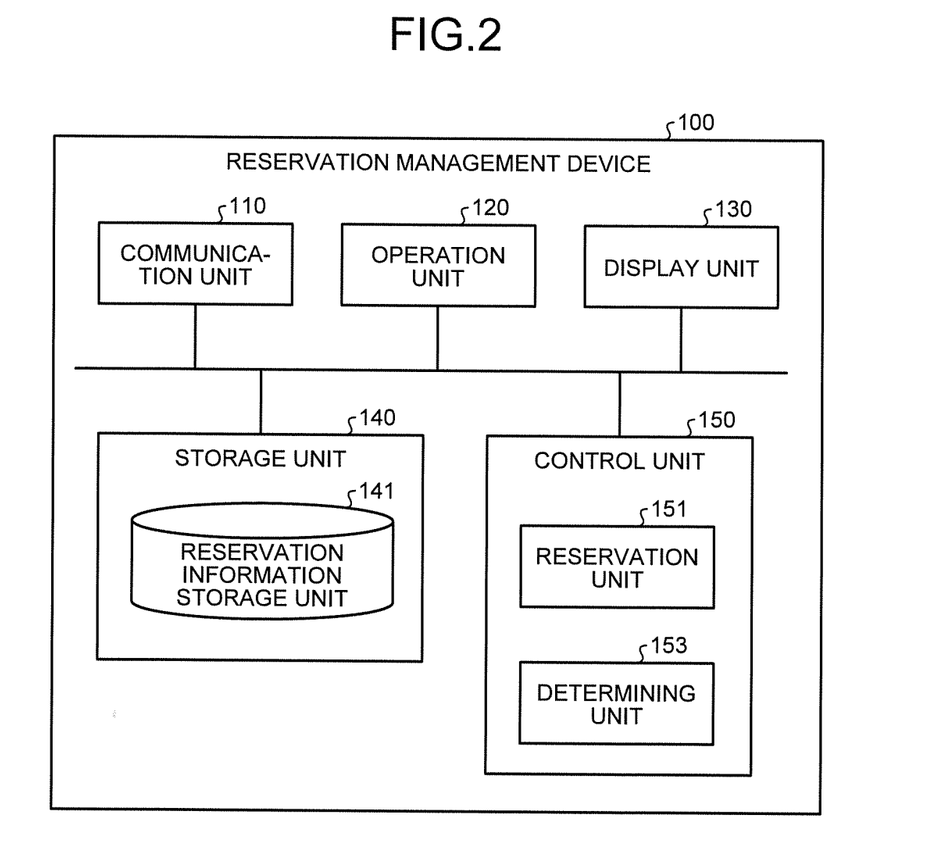
FIG. 2 is a block diagram illustrating an example of a configuration of a reservation management device of the embodiment.

FIG. 2 is a block diagram illustrating an example of a configuration of the reservation management device 100 of the embodiment. As illustrated in FIG. 2, the reservation management device 100 includes a communication unit 110, an operation unit 120, a display unit 130, a storage unit 140, and a control unit 150.

The communication unit 110 communicates with external devices such as the conference terminal control device 200, the remote management device 600, and the conference management device 700 through a network. The communication unit 110 can be implemented by a communication device such as a NIC (Network Interface Card).

The operation unit 120 performs an input of various operations. The operation unit 120 can be implemented by an input device such as a keyboard, a mouse, a touch pad, and a touch panel.

The display unit 130 displays various screens. The display unit 130 can be implemented by a display device such as a liquid crystal display and a touch panel type display.

The storage unit 140 stores various programs executed by the reservation management device 100, data used for various processing performed in the reservation management device 100, and the like. The storage unit 140 can be implemented by at least any one of storage devices, which can magnetically, optically, or electrically store data, such as, for example, an HDD (Hard Disk Drive), an SSD (Solid State Drive), a memory card, an optical disk, a ROM (Read Only Memory), and a RAM (Random Access Memory). The storage unit 140 includes a reservation information storage unit 141. The details of the reservation information storage unit 141 will be described later.

The control unit 150 controls each unit in the reservation management device 100. The control unit 150 can be implemented by a control device such as a CPU (Central Processing Unit). The control unit 150 includes a reservation unit 151 and a determining unit 153. The details of the reservation unit 151 and the determining unit 153 will be described later.

Figure 3:
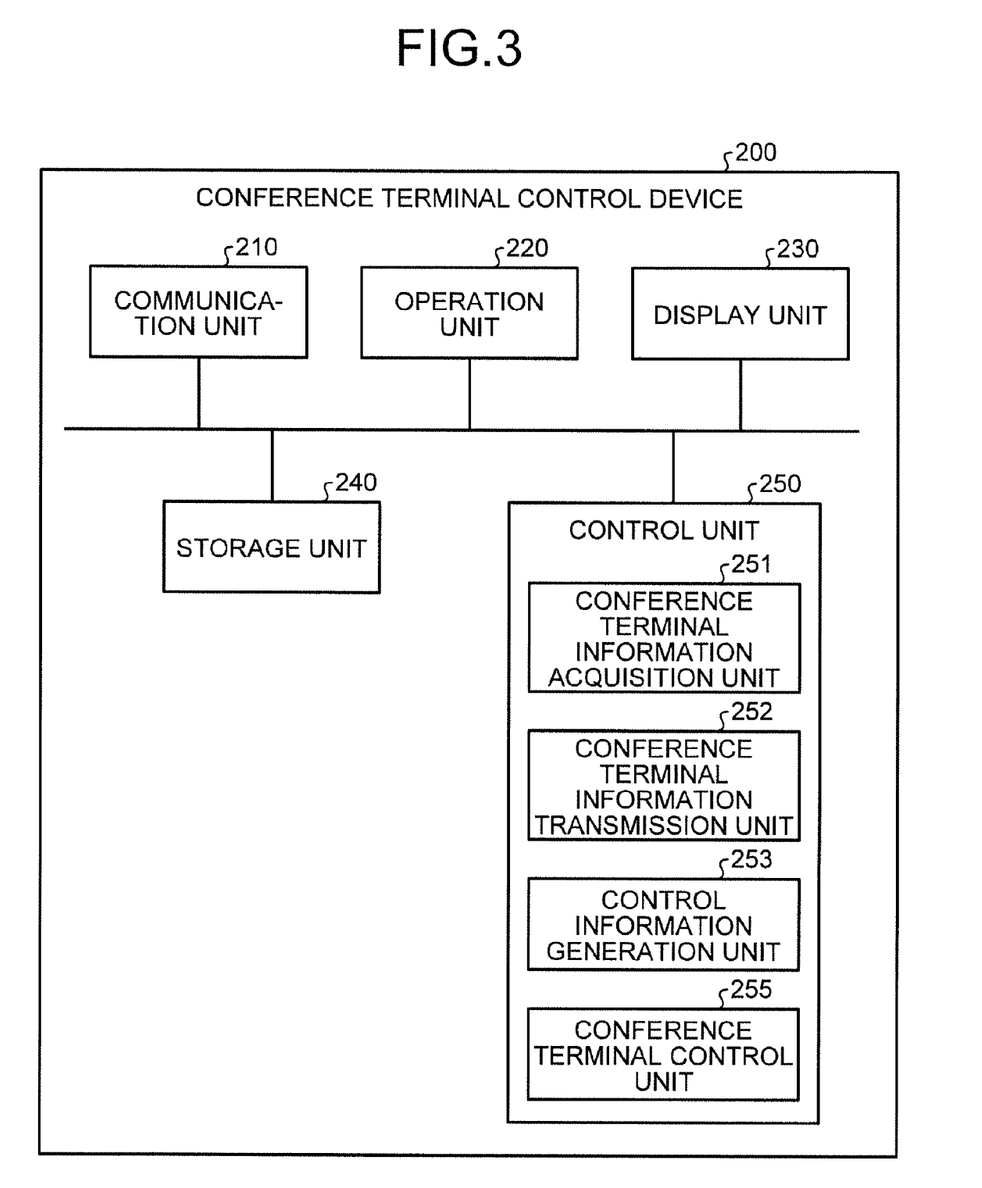
FIG. 3 is a block diagram illustrating an example of a configuration of a conference terminal control device of the embodiment.

FIG. 3 is a block diagram illustrating an example of a configuration of the conference terminal control device 200 of the embodiment. As illustrated in FIG. 3, the conference terminal control device 200 includes a communication unit 210, an operation unit 220, a display unit 230, a storage unit 240, and a control unit 250.

The communication unit 210 communicates with external devices such as the conference terminals 10-1 to 10-3, the reservation management device 100, and the remote management device 600 through a network. The communication unit 210 can be implemented by a communication device such as a NIC.

The operation unit 220 performs an input of various operations. The operation unit 220 can be implemented by an input device such as a keyboard, a mouse, a touch pad, and a touch panel.

The display unit 230 displays various screens. The display unit 230 can be implemented by a display device such as a liquid crystal display and a touch panel type display.

The storage unit 240 stores various programs executed by the conference terminal control device 200, data used for various processing performed in the conference terminal control device 200, and the like. The storage unit 240 can be implemented by at least any one of storage devices, which can magnetically, optically, or electrically store data, such as, for example, an HDD, an SSD, a memory card, an optical disk, a ROM, and a RAM. The details of the storage unit 240 will be described later.

The control unit 250 controls each unit in the conference terminal control device 200. The control unit 250 can be implemented by a control device such as a CPU. The control unit 250 includes a conference terminal information acquisition unit 251, a conference terminal information transmission unit 252, a control information generation unit 253, and a conference terminal control unit 255. The details of the conference terminal information acquisition unit 251, the conference terminal information transmission unit 252, the control information generation unit 253, and the conference terminal control unit 255 will be described later.

Figure 4:
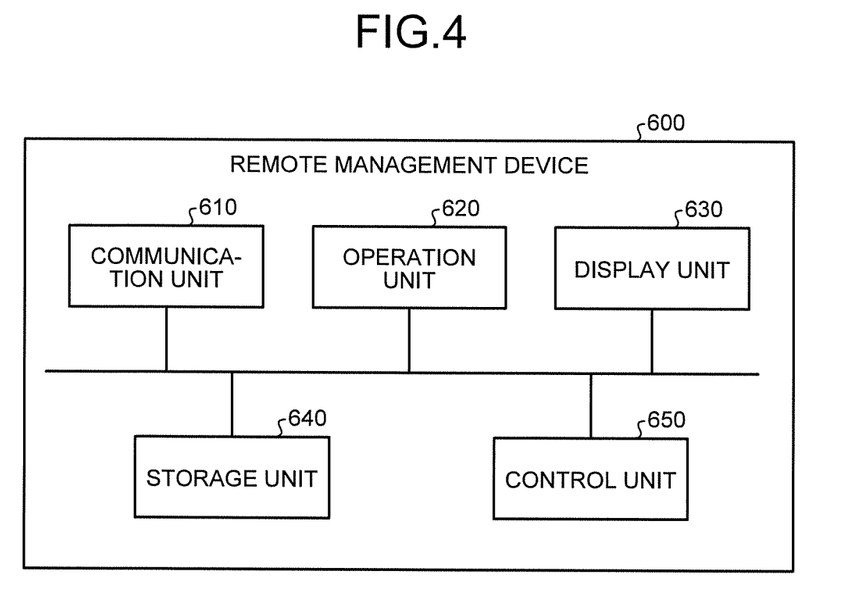
FIG. 4 is a block diagram illustrating an example of a configuration of a remote management device of the embodiment.

FIG. 4 is a block diagram illustrating an example of a configuration of the remote management device 600 of the embodiment. As illustrated in FIG. 4, the remote management device 600 includes a communication unit 610, an operation unit 620, a display unit 630, a storage unit 640, and a control unit 650.

The communication unit 610 communicates with external devices such as the reservation management device 100 and the conference terminal control device 200 through a network. The communication unit 610 can be implemented by a communication device such as a NIC.

The operation unit 620 performs an input of various operations. The operation unit 620 can be implemented by an input device such as a keyboard, a mouse, a touch pad, and a touch panel.

The display unit 630 displays various screens. The display unit 630 can be implemented by a display device such as a liquid crystal display and a touch panel type display.

The storage unit 640 stores various programs executed by the remote management device 600, data used for various processing performed in the remote management device 600, and the like. The storage unit 640 can be implemented by at least any one of storage devices, which can magnetically, optically, or electrically store data, such as, for example, an HDD, an SSD, a memory card, an optical disk, a ROM, and a RAM. The details of the storage unit 640 will be described later.

The control unit 650 controls each unit in the remote management device 600. The control unit 650 can be implemented by a control device such as a CPU. The details of the control unit 650 will be described later.

Figure 5:
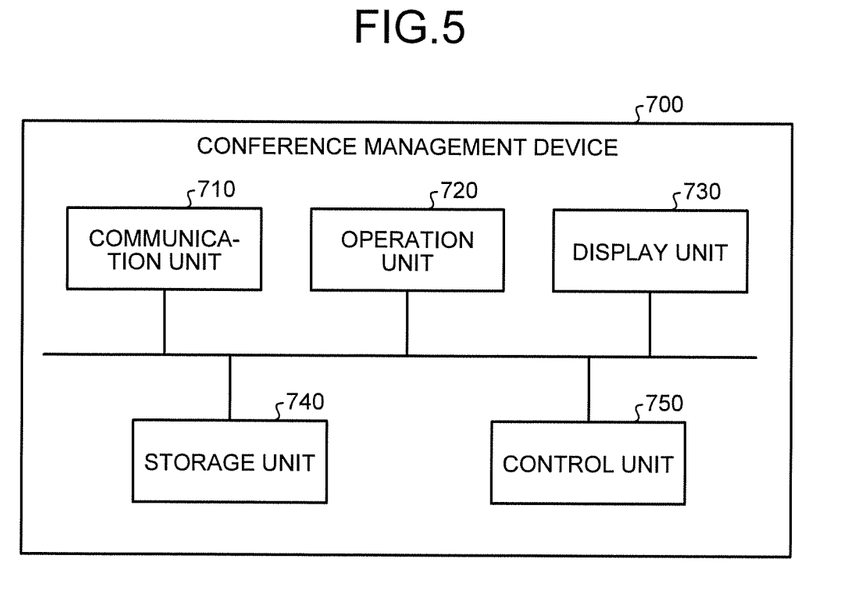
FIG. 5 is a block diagram illustrating an example of a configuration of a conference management device of the embodiment.

FIG. 5 is a block diagram illustrating an example of a configuration of the conference management device 700 of the embodiment. As illustrated in FIG. 5, the conference management device 700 includes a communication unit 710, an operation unit 720, a display unit 730, a storage unit 740, and a control unit 750 (an example of a conference control unit).

The communication unit 710 communicates with external devices such as the conference terminals 10-1 to 10-3, the reservation management device 100, and the conference terminal control device 200 through a network. The communication unit 710 can be implemented by a communication device such as a NIC.

The operation unit 720 performs an input of various operations. The operation unit 720 can be implemented by an input device such as a keyboard, a mouse, a touch pad, and a touch panel.

The display unit 730 displays various screens. The display unit 730 can be implemented by a display device such as a liquid crystal display and a touch panel type display.

The storage unit 740 stores various programs executed by the conference management device 700, data used for various processing performed in the conference management device 700, and the like. The storage unit 740 can be implemented by at least any one of storage devices, which can magnetically, optically, or electrically store data, such as, for example, an HDD, an SSD, a memory card, an optical disk, a ROM, and a RAM. The details of the storage unit 740 will be described later.

The control unit 750 controls each unit in the conference management device 700. The control unit 750 can be implemented by a control device such as a CPU. The details of the control unit 750 will be described later.

First, the storage unit 240, the conference terminal information acquisition unit 251, and the conference terminal information transmission unit 252 of the conference terminal control device 200, and the storage unit 640 and the control unit 650 of the remote management device 600 will be described.

The conference terminal information acquisition unit 251 of the conference terminal control device 200 acquires conference terminal information from the conference terminal 10 and manages the conference terminal information on the storage unit 240. Specifically, the conference terminal information acquisition unit 251 performs communication using a general-purpose protocol such as an SNMP (Simple Network Management Protocol), which is generally used for device management, with the conference terminal 10 and acquires the conference terminal information. The acquisition method of the conference terminal information may be a method in which the conference terminal information acquisition unit 251 proactively acquires the conference terminal information from the conference terminal 10 or may be a method in which the conference terminal 10 proactively transmits the conference terminal information to the conference terminal control device 200 (the conference terminal information acquisition unit 251).

In the embodiment, the conference terminal information acquisition unit 251 of the conference terminal control device 200-1 acquires the conference terminal information from each of the conference terminals 10-1 and 10-2, and the conference terminal information acquisition unit 251 of the conference terminal control device 200-2 acquires the conference terminal information from the conference terminal 10-3.

The conference terminal information of the embodiment includes ID, conference room identification information, a conference room name, and conference terminal identification information. The ID is an identifier that identifies the conference terminal information and is given by the conference terminal information acquisition unit 251. The conference room identification information is an identifier that identifies a conference room in which the conference terminal 10 is arranged. For example, the conference room identification information is a conference room ID. The conference room name is a name of the conference room in which the conference terminal 10 is arranged. The conference terminal identification information is an identifier that identifies the conference terminal 10 on the network. For example, the conference terminal identification information is an IP address.

The conference terminal 10 stores at least the conference room identification information, the conference room name, and the conference terminal identification information as the conference terminal information. The conference room identification information, the conference room name, and the conference terminal identification information may be automatically collected by the conference terminal 10 or may be input by a user.

Figure 6:
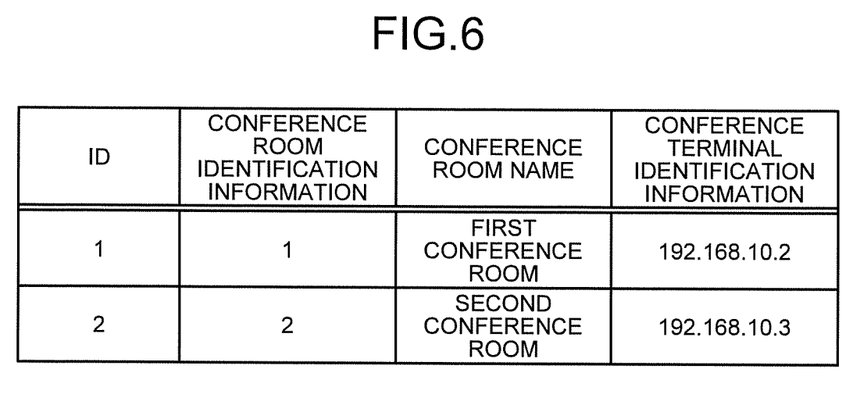
FIG. 6 is a diagram illustrating an example of conference terminal information of the embodiment.
Figure 7:
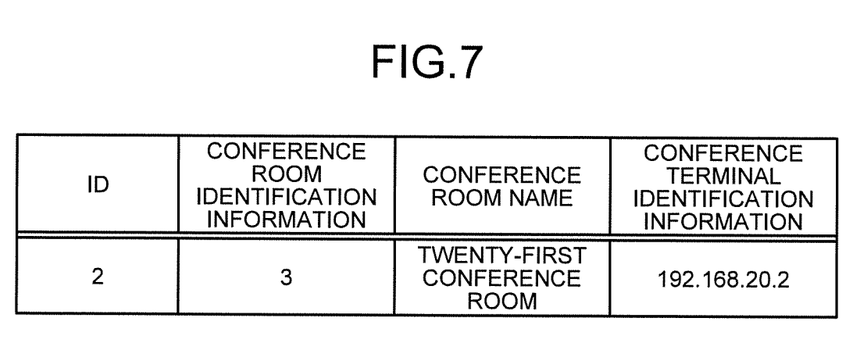
FIG. 7 is a diagram illustrating an example of conference terminal information of the embodiment.

FIGS. 6 and 7 are diagrams illustrating an example of the conference terminal information of the embodiment. FIG. 6 illustrates the conference terminal information stored in the storage unit 240 of the conference terminal control device 200-1. FIG. 7 illustrates the conference terminal information stored in the storage unit 240 of the conference terminal control device 200-2.

The conference terminal information transmission unit 252 of the conference terminal control device 200 periodically transmits the conference terminal information managed on the storage unit 240 to the remote management device 600. The transmission method of the conference terminal information may be a method in which the conference terminal information transmission unit 252 proactively transmits the conference terminal information to the remote management device 600 or may be a method in which the remote management device 600 proactively acquires the conference terminal information from the conference terminal control device 200 (the conference terminal information transmission unit 252).

Figure 8:
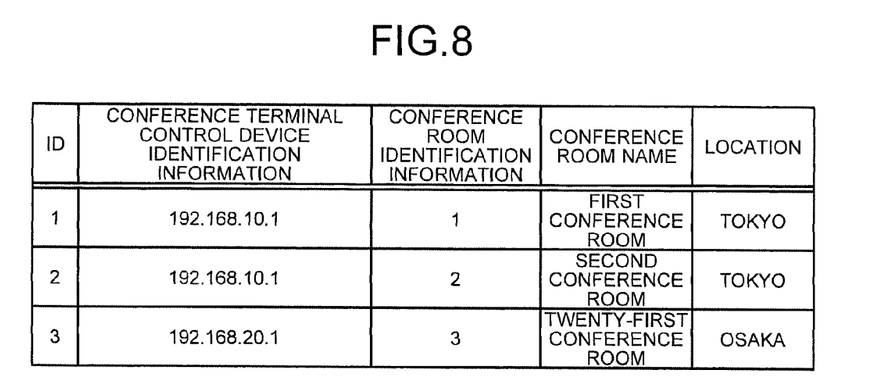
FIG. 8 is a diagram illustrating an example of conference terminal information of the embodiment.

The control unit 650 of the remote management device 600 acquires the conference terminal information from the conference terminal control device 200 and manages the conference terminal information on the storage unit 640. FIG. 8 is a diagram illustrating an example of the conference terminal information of the embodiment, which is the conference terminal information stored in the storage unit 640 of the remote management device 600. Although the conference terminal information illustrated in FIG. 8 is a sum of the conference terminal information illustrated in FIG. 6 and the conference terminal information illustrated in FIG. 7, conference terminal control device identification information and location are added and the conference terminal identification information is removed by the control unit 650.

The conference terminal control device identification information is an identifier that identifies the conference terminal control device 200 that acquires the conference terminal information. For example, the conference terminal control device identification information is a conference terminal control device ID. The location is a location of the conference terminal control device 200 that acquires the conference terminal information.

Next, the reservation unit 151, the determining unit 153, and the reservation information storage unit 141 of the reservation management device 100 will be described.

The reservation unit 151 receives the conference room identification information of each of two or more locations where a conference over a network is conducted and an input of conference date and time when the conference is conducted and makes a reservation to conduct the conference over the network at the two or more locations at the conference date and time by using a conference terminal arranged at each of the two or more locations.

For example, the reservation unit 151 acquires the conference terminal information from the remote management device 600, generates a conference information input screen by using the acquired conference terminal information, and transmits the conference information input screen to an information processing device used by a user such as an organizer of the conference.

Figure 9:
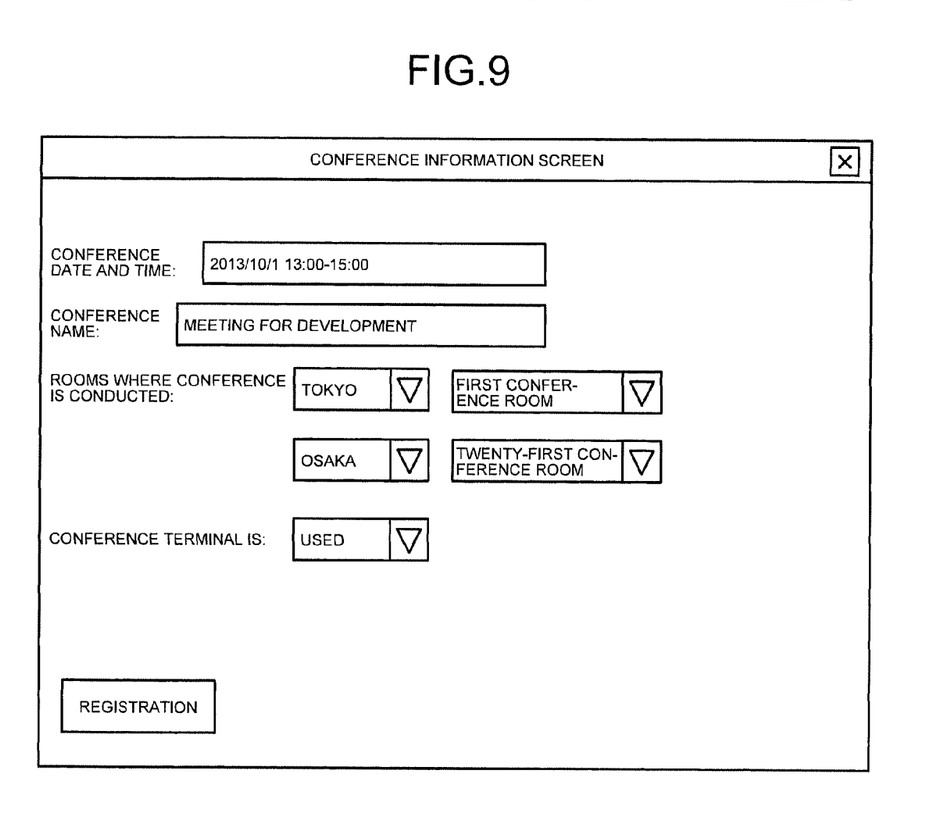
FIG. 9 is a diagram illustrating an example of a conference information input screen of the embodiment.

FIG. 9 is a diagram illustrating an example of a conference information input screen of the embodiment. In the conference information input screen illustrated in FIG. 9, a conference date and time, a conference name, rooms where the conference is conducted (conference rooms), and use or non-use of conference terminal are input. The rooms where the conference is conducted are selected from options. This is because the conference terminal information acquired from the remote management device 600 is used.

Thereby, the user inputs reservation content on the information processing device and the reservation unit 151 receives the reserved content from the information processing device. Then, the reservation unit 151 generates reservation information that makes a reservation to conduct a conference over a network at the conference date and time by using conference terminals arranged in the conference rooms indicated by the received conference room identification information, stores the reservation information in the reservation information storage unit 141, and transmits the reservation information to the conference management device 700. The reservation unit 151 need not transmit all the reservation information to the conference management device 700, but may transmit some of the conference information, such as the ID and the conference date and time, to the conference management device 700.

Figure 10:
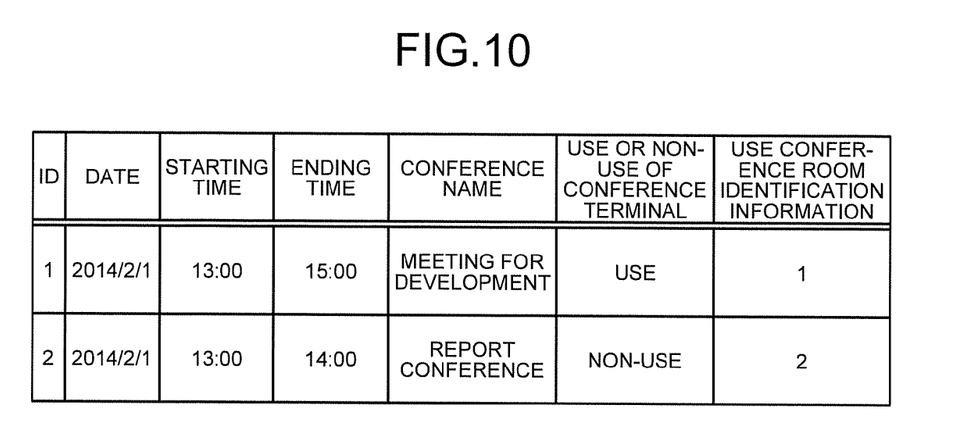
FIG. 10 is a diagram illustrating an example of reservation information of the embodiment.

FIG. 10 is a diagram illustrating an example of the reservation information of the embodiment. In the example of FIG. 10, the reservation information is information including an ID, a date, a starting time, an ending time, a conference name, use or non-use of conference terminal, and use conference room identification information. However, the reservation information is not limited to this information.

Figure 11:
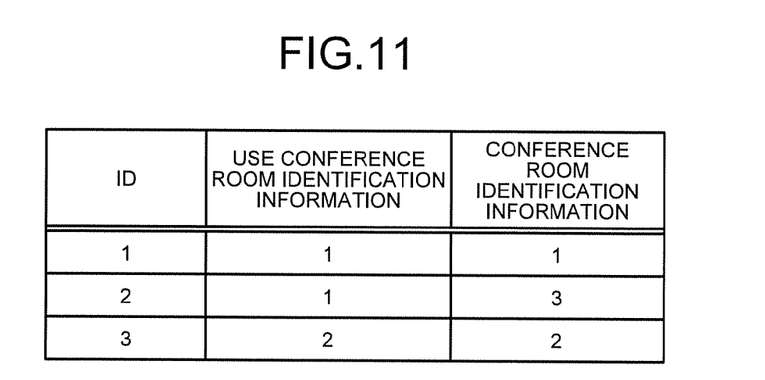
FIG. 11 is a diagram illustrating an example of use conference room identification information of the embodiment.

The ID is an identifier that identifies the conference information and is given by the reservation unit 151. The date and time, the starting time, and the ending time indicate the input conference date and time. The conference name indicates the input conference name. The use or non-use of conference terminal indicates the input use or non-use of conference terminal. The use conference room identification information is an identifier that identifies all the input rooms (conference rooms) and has a correspondence relationship as illustrated in FIG. 11. Specifically, when the use conference room identification information is (1), it indicates that the conference rooms indicated by the conference room identification information (1, 3) are used, and when the use conference room identification information is (2), it indicates that the conference room indicated by the conference room identification information (2) is used.

For example, the reservation information of the ID (1) illustrated in FIG. 10 is information indicating that a conference over a network is conducted between the first conference room and the twenty-first conference room by using conference terminals respectively arranged in the first conference room indicated by the conference room identification information 1 and the twenty-first conference room indicated by the conference room identification information 3 from 13:00 to 15:00 on Feb. 1, 2014.

The determining unit 153 determines the presence or absence of reservation information indicating that the conference date and time starts after a predetermined period of time by referring to the reservation information stored in the reservation information storage unit 141. When there is the reservation information indicating that the conference date and time starts after the predetermined period of time, the determining unit 153 notifies the remote management device 600 of the conference room identification information indicated by the use conference room identification information included in the reservation information. The predetermined period of time can be set according to a use situation of the conference terminal control system 1. For example, the predetermined period of time can be set to three minutes or five minutes.

For example, when the reservation information indicating that the conference date and time starts after the predetermined period of time is the reservation information of the ID (1) illustrated in FIG. 10, the determining unit 153 notifies the remote management device 600 of the conference room identification information (1, 3) indicated by the use conference room identification information (1). The determining unit 153 may further notify the remote management device 600 of the ID (1) of the reservation information.

Here, the remote management device 600 will be described again.

When the conference room identification information is notified from the reservation management device 100 to the control unit 650 of the remote management device 600, the control unit 650 refers to the conference terminal information stored in the storage unit 640 and notifies the conference terminal control device 200 indicated by the conference terminal control device identification information associated with the notified conference room identification information of the notified conference room identification information.

For example, when the conference room identification information notified from the reservation management device 100 is (1, 3), the control unit 650 refers to the conference terminal information illustrated in FIG. 8, notifies the conference terminal control device 200-1 which is indicated by the conference terminal control device identification information (192.168.10.1) of the conference room identification (1), and notifies the conference terminal control device 200-2 which is indicated by the conference terminal control device identification information (192.168.20.1) of the conference room identification (3).

The control unit 650 may further notify the conference terminal control device 200 of the notified ID (1) of the reservation information.

Next, the control information generation unit 253 and the conference terminal control unit 255 of the conference terminal control device 200 will be described.

When the conference room identification information is notified from the remote management device 600 to the control information generation unit 253 of the conference terminal control device 200, the control information generation unit 253 refers to the conference terminal information stored in the storage unit 240 and acquires the conference terminal identification information associated with the notified conference room identification information. Then, the control information generation unit 253 generates control information for controlling the conference terminal indicated by the acquired conference terminal identification information to be in a power-on state and controlling the conference terminal to be able to conduct a conference over a network by using the acquired conference terminal identification information. Examples of the control information include a power-on command for WOL (Wake On LAN) using the conference terminal identification information.

For example, when the conference room identification information (1) is notified from the remote management device 600 to the conference terminal control device 200-1, the control information generation unit 253 of the conference terminal control device 200-1 refers to the conference terminal information illustrated in FIG. 6 and acquires the conference terminal identification information (192.168.10.2) associated with the conference room identification information (1). Then, the control information generation unit 253 generates control information for controlling the conference terminal 10-1 indicated by the acquired conference terminal identification information (192.168.10.2) to be in a power-on state and controlling the conference terminal 10-1 to be able to conduct a conference over a network by using the acquired conference terminal identification information (192.168.10.2).

Further, for example, when the conference room identification information (3) is notified from the remote management device 600 to the conference terminal control device 200-2, the control information generation unit 253 of the conference terminal control device 200-2 refers to the conference terminal information illustrated in FIG. 7 and acquires the conference terminal identification information (192.168.20.2) associated with the conference room identification information (3). Then, the control information generation unit 253 generates control information for controlling the conference terminal 10-3 indicated by the acquired conference terminal identification information (192.168.20.2) to be in a power-on state and controlling the conference terminal 10-3 to be able to conduct a conference over a network by using the acquired conference terminal identification information (192.168.20.2).

The control information for controlling the conference terminal to be in a power-on state may be different from the control information for controlling the conference terminal to be able to conduct a conference over a network.

In the embodiment, when the reservation management device 100 determines that it is time a predetermined time before the start of conference time, the reservation management device 100 transmits a notification to the remote management device 600, so that the control information generation unit 253 generates the control information after the time a predetermined time before the start of conference time. However, the generation timing is not limited to this. For example, the control information may be generated in advance.

Then, the conference terminal control unit 255 of the conference terminal control device 200 controls the conference terminal 10 to be in a power-on state and to be able to conduct a conference over a network by using the control information generated by the control information generation unit 253. The conference terminal control unit 255 may further notify the conference terminal 10 of the notified ID of the reservation information in order to control the conference terminal 10 to be able to conduct a conference over a network.

Next, the storage unit 740 and the control unit 750 of the conference management device 700 will be described.

The control unit 750 stores the reservation information notified from the reservation management device 100 in the storage unit 740. When the conference terminal control device 200 controls the conference terminal 10 to be able to conduct a conference over a network, the conference terminal 10 requests the conference management device 700 to connect the conference terminal 10 to another conference terminal 10 through a network. Therefore, the control unit 750 refers to the storage unit 740, and when there is reservation information after the time a predetermined time before the starting time, the control unit 750 connects the conference terminals 10 which request connection through a network and controls the conference terminals 10 to be able to conduct a conference over a network.

When the conference terminals 10 notify the conference management device 700 of the ID (1) of the reservation information along with the request of connection, the control unit 750 refers to the storage unit 740, and if it is time before the starting time of the reservation information of the notified ID (1) and after a predetermined time before the starting time, the control unit 750 connects the conference terminals 10, which notify of the ID (1) of the reservation information, to each other through a network and controls the conference terminals 10 to be able to conduct a conference over a network.

For example, it is assumed that the conference terminals 10-1 notifies the conference management device 700 of the ID (1) of the reservation information along with the request of connection and the conference terminals 10-3 notifies the conference management device 700 of the ID (1) of the reservation information along with the request of connection. In this case, the control unit 750 refers to the storage unit 740, and if it is time before the starting time of the reservation information of the notified ID (1) and after a predetermined time before the starting time, the control unit 750 connects the conference terminals 10-1 and 10-3, which notify of the ID (1) of the reservation information, to each other through a network and controls the conference terminals 10-1 and 10-3 to be able to conduct a conference over a network.

Figure 12:
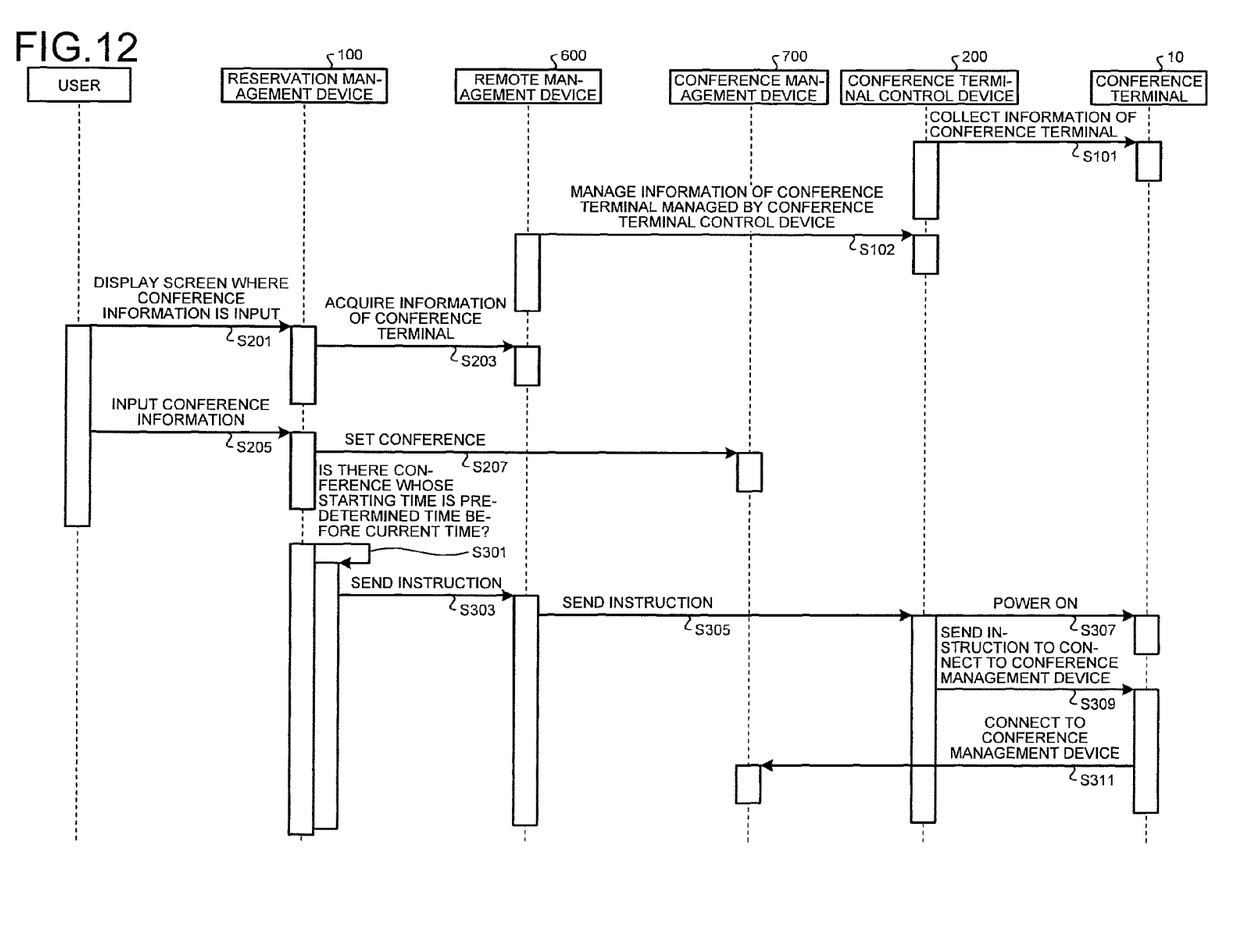
FIG. 12 is a flowchart illustrating an example of processing performed in the conference terminal control system of the embodiment.

FIG. 12 is a flowchart illustrating an example of processing performed in the conference terminal control system 1 of the embodiment.

First, the conference terminal information acquisition unit 251 of the conference terminal control device 200 acquires the conference terminal information from the conference terminal 10 to be managed and manages the conference terminal information on the storage unit 240 (step S101).

Subsequently, the control unit 650 of the remote management device 600 acquires the conference terminal information from the conference terminal control device 200 and manages the conference terminal information on the storage unit 640 (step S102).

Subsequently, when the reservation unit 151 of the reservation management device 100 receives a transmission request of the conference information input screen from an information processing device used by a user (step S201), the reservation unit 151 acquires the conference terminal information from the remote management device 600 (step S203), generates the conference information input screen by using the acquired conference terminal information, and transmits the conference information input screen to the information processing device used by the user.

Subsequently, the user inputs the conference information (reservation content) on the information processing device (step S205) and the reservation unit 151 generates reservation information based on the content reserved from the information processing device, stores the reservation information in the reservation information storage unit 141, and transmits the reservation information to the conference management device 700 (step S207). Thereby, the control unit 750 of the conference management device 700 manages the reservation information on the storage unit 740.

Subsequently, the determining unit 153 of the reservation management device 100 determines the presence or absence of reservation information indicating that the conference date and time starts after a predetermined period of time by referring to the reservation information stored in the reservation information storage unit 141 (step S301), and when there is the reservation information indicating that the conference date and time starts after the predetermined period of time, the determining unit 153 notifies the remote management device 600 of the conference room identification information indicated by the use conference room identification information included in the reservation information (step S303).

Subsequently, when the conference room identification information is notified from the reservation management device 100 to the control unit 650 of the remote management device 600, the control unit 650 refers to the conference terminal information stored in the storage unit 640 and notifies the conference terminal control device 200 indicated by the conference terminal control device identification information associated with the notified conference room identification information of the notified conference room identification information (step S305).

Subsequently, when the conference room identification information is notified from the remote management device 600 to the control information generation unit 253 of the conference terminal control device 200, the control information generation unit 253 refers to the conference terminal information stored in the storage unit 240 and acquires the conference terminal identification information associated with the notified conference room identification information. Then, the control information generation unit 253 generates control information for controlling the conference terminal 10 indicated by the acquired conference terminal identification information to be in a power-on state and controlling the conference terminal 10 to be able to conduct a conference over a network by using the acquired conference terminal identification information. Further, the conference terminal control unit 255 of the conference terminal control device 200 controls the conference terminal 10 to be in a power-on state (step S307) and controls the conference terminal 10 to be able to conduct a conference over a network (step S309) by using the control information generated by the control information generation unit 253.

Thereby, the conference terminal 10 requests the conference management device 700 to connect the conference terminal 10 to another conference terminal 10 through a network (step S311), so that the control unit 750 of the conference management device 700 refers to the storage unit 740, and when there is reservation information after the time a predetermined time before the starting time, the control unit 750 connects the conference terminals 10 which request connection through a network and controls the conference terminals 10 to be able to conduct a conference over a network.

As described above, in the embodiment, the conference terminal control device manages a relationship between a conference room and a conference terminal arranged in the conference room, so that the reservation management device notifies one or more conference terminal control devices of information of a reserved conference room when it becomes time a predetermined time before the reserved conference time, and the one or more conference terminal control devices control the conference terminal arranged in the notified conference room to be able to conduct a conference over a network.

Therefore, according to the embodiment, when a user only reserves a conference room and a conference time, a conference over a network becomes able to be conducted in the reserved conference room when it becomes the reserved conference time. Therefore, it is possible to simplify the operation required to start a conference over a network.

Modified Example

In the embodiment described above, some or all of the functions included in the reservation management device 100, the conference terminal control device 200, the remote management device 600, and the conference management device 700 may be integrated in one device.

(Hardware Configuration)

Figure 13:
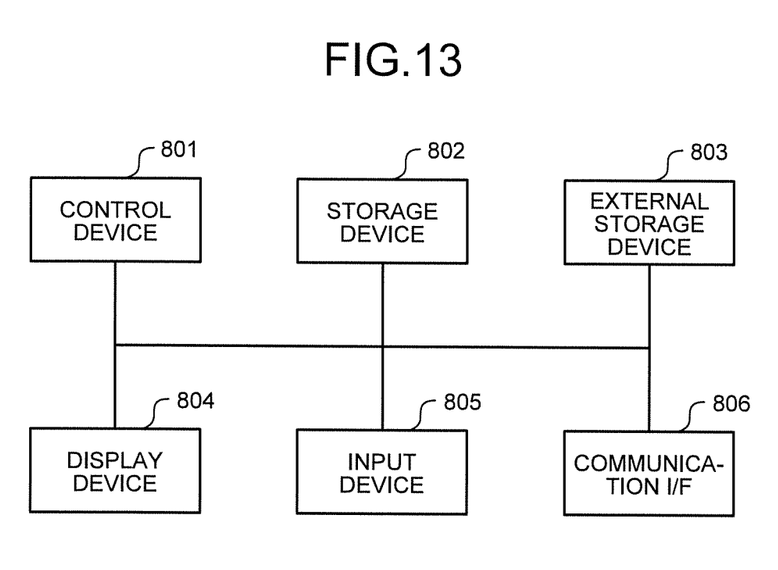
FIG. 13 is a diagram illustrating an example of a hardware configuration of each device of the aforementioned embodiment.

FIG. 13 is a diagram illustrating an example of a hardware configuration of the reservation management device 100, the conference terminal control device 200, the remote management device 600, and the conference management device 700 of the aforementioned embodiment (hereinafter referred to as each device of the aforementioned embodiment). Each device of the aforementioned embodiment includes a control device 801 such as a CPU, a storage device 802 such as a ROM and a RAM, an external storage device 803 such as an HDD, a display device 804 such as a display, an input device 805 such as a keyboard and a mouse, and a communication I/F (interface) 806, and has a hardware configuration using a normal computer.

A program executed in each device of the aforementioned embodiment is provided by storing the program as a file of an installable format or an executable format in a computer-readable recording medium, such as a CD-ROM, a CD-R, a memory card, a DVD (Digital Versatile Disk), and a flexible disk (FD).

The program executed in each device of the aforementioned embodiment may be provided by storing the program in a computer connected to a network such as the Internet and causing the program to be downloaded through the network. The program executed in each device of the aforementioned embodiment may be provided or distributed through a network such as the Internet. The program executed in each device of the aforementioned embodiment may be provided by installing the program in a ROM or the like in advance.

The program executed in each device of the aforementioned embodiment has a module configuration to implement each unit described above on a computer. As actual hardware, a CPU reads the program from an HDD, stores the program in a RAM, and executes the program, so that each unit described above is implemented on a computer.

According to the present invention, an effect is obtained in which an operation required to start a conference over a network is simplified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conference terminal control system that controls conference terminals connected through a network, the conference terminal control system comprising:
one or more processors, each processor in communication with a storage device and configured by execution of one or more programs to perform a method including the steps of:
receiving an input of conference room identification information of each of two or more conference rooms where a conference over a network is conducted and a conference date and time when the conference is conducted;
making a reservation to conduct the conference over the network in the two or more conference rooms at the conference date and time by using two or more conference terminals respectively arranged in the two or more conference rooms;
performing conference terminal control to control the two or more conference terminals to be in a power-on state and control the two or more conference terminals to be able to conduct the conference over the network, based on the conference date and time and two or more pieces of conference terminal identification information that respectively identify the two or more conference terminals on the network and that are based on the two or more pieces of conference room identification information;
receiving a connection request from each of the two or more conference terminals to be connected through the network based on the conference terminal control; and
connecting the two or more conference terminals, which sent the connection request, through the network, and enabling the two or more conference terminals to conduct the conference over the network.

2. The conference terminal control system according to claim 1,
wherein the storage device stores therein conference terminal information in which each piece of the conference room identification information is associated with conference terminal identification information of a conference terminal arranged in a conference room indicated by the conference room identification information,
wherein the processor acquires the two or more pieces of conference terminal identification information respectively corresponding to the two or more pieces of conference room identification information by using the conference terminal information stored in the storage device.

3. The conference terminal control system according to claim 1, further comprising the two or more conference terminals, wherein each of the two or more conference terminals sends a connection request to be connected through the network based on control of the conference terminal control unit.

4. A conference terminal control method of controlling conference terminals connected through a network, the conference terminal control method comprising:
receiving an input of conference room identification information of each of two or more conference rooms where a conference over a network is conducted and a conference date and time when the conference is conducted;
making a reservation to conduct the conference over the network in the two or more conference rooms at the conference date and time by using two or more conference terminals respectively arranged in the two or more conference rooms;
controlling the two or more conference terminals to be in a power-on state and controlling the two or more conference terminals to be able to conduct the conference over the network, based on the conference date and time and two or more pieces of conference terminal identification information that respectively identify the two or more conference terminals on the network and that are based on the two or more pieces of conference room identification information; and
acquiring the two or more pieces of conference terminal identification information based on the two or more pieces of conference room identification information and generating control information for controlling the two or more conference terminals to be in a power-on state and controlling the two or more conference terminals to be able to conduct the conference over the network by using the two or more pieces of conference terminal identification information,
wherein the two or more conference terminals are controlled to be in a power-on state and the two or more conference terminals are controlled to be able to conduct the conference over the network, busing the control information at a predetermined time before start of the conference date and time.

5. A conference terminal control apparatus that controls conference terminals connected through a network, the conference terminal control apparatus comprising a processor in communication with a storage device and configured by execution of one or more programs to perform a method including the steps of:
receiving an input of conference room identification information of each of two or more conference rooms where a conference over a network is conducted and a conference date and time when the conference is conducted;
making a reservation to conduct the conference over the network in the two or more conference rooms at the conference date and time by using two or more conference terminals respectively arranged in the two or more conference rooms;
controlling the two or more conference terminals to be in a power-on state and control the two or more conference terminals to be able to conduct the conference over the network, based on the conference date and time and two or more pieces of conference terminal identification information that respectively identify the two or more conference terminals on the network and that are based on the two or more pieces of conference room identification information; and acquiring the two or more pieces of conference terminal identification information based on the two or more pieces of conference room identification information, and generating control information for controlling the two or more conference terminals to be in a power-on state and controlling the two or more conference terminals to be able to conduct the conference over the network by using the two or more pieces of conference terminal identification information, wherein the two or more conference terminals are controlled to be in a power-on state and the two or more conference terminals are controlled to be able to conduct the conference over the network, by using the control information at a predetermined time before start of the conference date and time.

6. The conference terminal control apparatus according to claim 5, wherein the storage device stores therein conference terminal information in which each piece of the conference room identification information is associated with conference terminal identification information of a conference terminal arranged in a conference room indicated by the conference room identification information, wherein the processor acquires the two or more pieces of conference terminal identification information respectively corresponding to the two or more pieces of conference room identification information by using the conference terminal information stored in the storage device.

* * * * *